United States Patent [19]
Wu

[11] Patent Number: 5,889,853
[45] Date of Patent: Mar. 30, 1999

[54] ADJUSTABLE-PERIOD DUAL-TONE MULTIFREQUENCY GENERATOR

[75] Inventor: Rong-Tyan Wu, Taichung, Taiwan

[73] Assignee: Holtek Microelectronics Inc., Hsinchu, Taiwan

[21] Appl. No.: 707,142

[22] Filed: Sep. 3, 1996

[51] Int. Cl.[6] .................................................. H04M 1/00
[52] U.S. Cl. ......................... 379/361; 379/362; 379/418; 364/721
[58] Field of Search .................................. 379/355, 361, 379/362; 364/721

[56] References Cited

U.S. PATENT DOCUMENTS

| | | | |
|---|---|---|---|
| 4,110,567 | 8/1978 | Boucher . | |
| 4,132,871 | 1/1979 | Lake . | |
| 4,639,554 | 1/1987 | Masuda et al. | 340/365 |
| 4,727,570 | 2/1988 | Tarbouriech | 379/361 |
| 4,998,276 | 3/1991 | Hasegawa | 379/361 |
| 5,034,977 | 7/1991 | Chen et al. | 379/361 |
| 5,475,627 | 12/1995 | Inoue | 364/721 |

*Primary Examiner*—Fan S. Tsang
*Assistant Examiner*—Shih-Wen Hsieh
*Attorney, Agent, or Firm*—W. Wayne Liauh

[57] ABSTRACT

An adjustable-period dual-tone multifrequency (DTMF) generator, which includes a plurality of programmable counters or up/down counters, a control unit, a memory unit for storing data, a digital adder, and a digital-to-analog converter. The programmable counter and the control unit are combined together to form into at least two programmable counting address generators, in which the circuit is a digit-process circuit for overcoming the problem of signal distortion that usually exists in an analog circuit.

10 Claims, 7 Drawing Sheets

| Data values (Relative Voltages Values) | Digital values of data stored | Counting digits |
|---|---|---|
| 0 | 00000 | 0000 |
| 0.61 | 00001 | 0001 |
| 1.86 | 00011 | 0010 |
| 3.56 | 00101 | 0011 |
| 5.74 | 01000 | 0100 |
| 8.19 | 01011 | 0101 |
| 11.00 | 01110 | 0110 |
| 13.98 | 10001 | 0111 |
| 16.96 | 10100 | 1000 |
| 19.94 | 10110 | 1001 |
| 22.75 | 10111 | 1010 |
| 25.30 | 11001 | 1011 |
| 27.48 | 11011 | 1100 |
| 29.18 | 11101 | 1101 |
| 30.34 | 11110 | 1110 |
| 30.95 | 11111 | 1111 |
| 30.34 | 11110 | 1110 |
| 29.18 | 11101 | 1101 |
| 27.48 | 11011 | 1100 |
| 25.30 | 11001 | 1011 |
| 22.75 | 10111 | 1010 |
| 19.94 | 10110 | 1001 |
| 16.96 | 10100 | 1000 |
| 13.98 | 10001 | 0111 |
| 11.00 | 01110 | 0110 |
| 8.19 | 01011 | 0101 |
| 5.74 | 01000 | 0100 |
| 3.56 | 00101 | 0011 |
| 1.86 | 00011 | 0010 |
| 0.61 | 00001 | 0001 |

FIG. 6

| Data values (Relative Voltages Values) | Digital values of data stored | Counting digits | True address |
|---|---|---|---|
| 0.07 | 00000 | 0000 | 0000 |
| 0.67 | 00001 | 0001 | 0001 |
| 1.82 | 00011 | 0010 | 0010 |
| 3.52 | 00101 | 0011 | 0011 |
| 5.67 | 01000 | 0100 | 0100 |
| 8.19 | 01011 | 0101 | 0101 |
| 11.00 | 01110 | 0110 | 0110 |
| 13.98 | 10001 | 0111 | 0111 |
| 17.02 | 10100 | 1000 | 1000 |
| 20.00 | 10110 | 1001 | 1001 |
| 22.81 | 10111 | 1010 | 1010 |
| 25.33 | 11001 | 1011 | 1011 |
| 27.48 | 11011 | 1100 | 1100 |
| 29.17 | 11101 | 1101 | 1101 |
| 30.33 | 11110 | 1110 | 1110 |
| 30.93 | 11111 | 1111 | 1111 |
| 30.93 | 11111 | 0000 | 1111 |
| 30.33 | 11110 | 0001 | 1110 |
| 29.17 | 11101 | 0010 | 1101 |
| 27.48 | 11011 | 0011 | 1100 |
| 25.33 | 11001 | 0100 | 1011 |
| 22.81 | 10111 | 0101 | 1010 |
| 20.00 | 10110 | 0110 | 1001 |
| 17.02 | 10100 | 0111 | 1000 |
| 13.98 | 10001 | 1000 | 0111 |
| 11.00 | 01110 | 1001 | 0110 |
| 8.19 | 01011 | 1010 | 0101 |
| 5.67 | 01000 | 1011 | 0100 |
| 3.52 | 00101 | 1100 | 0011 |
| 1.83 | 00011 | 1101 | 0010 |
| 0.67 | 00001 | 1110 | 0001 |
| 0.07 | 00000 | 1111 | 0000 |

FIG. 7

ADJUSTABLE-PERIOD DUAL-TONE MULTIFREQUENCY GENERATOR

BACKGROUND OF THE INVENTION

1. Field of the Invention

This invention relates to an adjustable-period dual-tone multifrequency (DTMF) generator, and, particularly, to a generator for generating a DTMF signal using a digital circuit.

2. Description of the Prior Art

Figure 1:
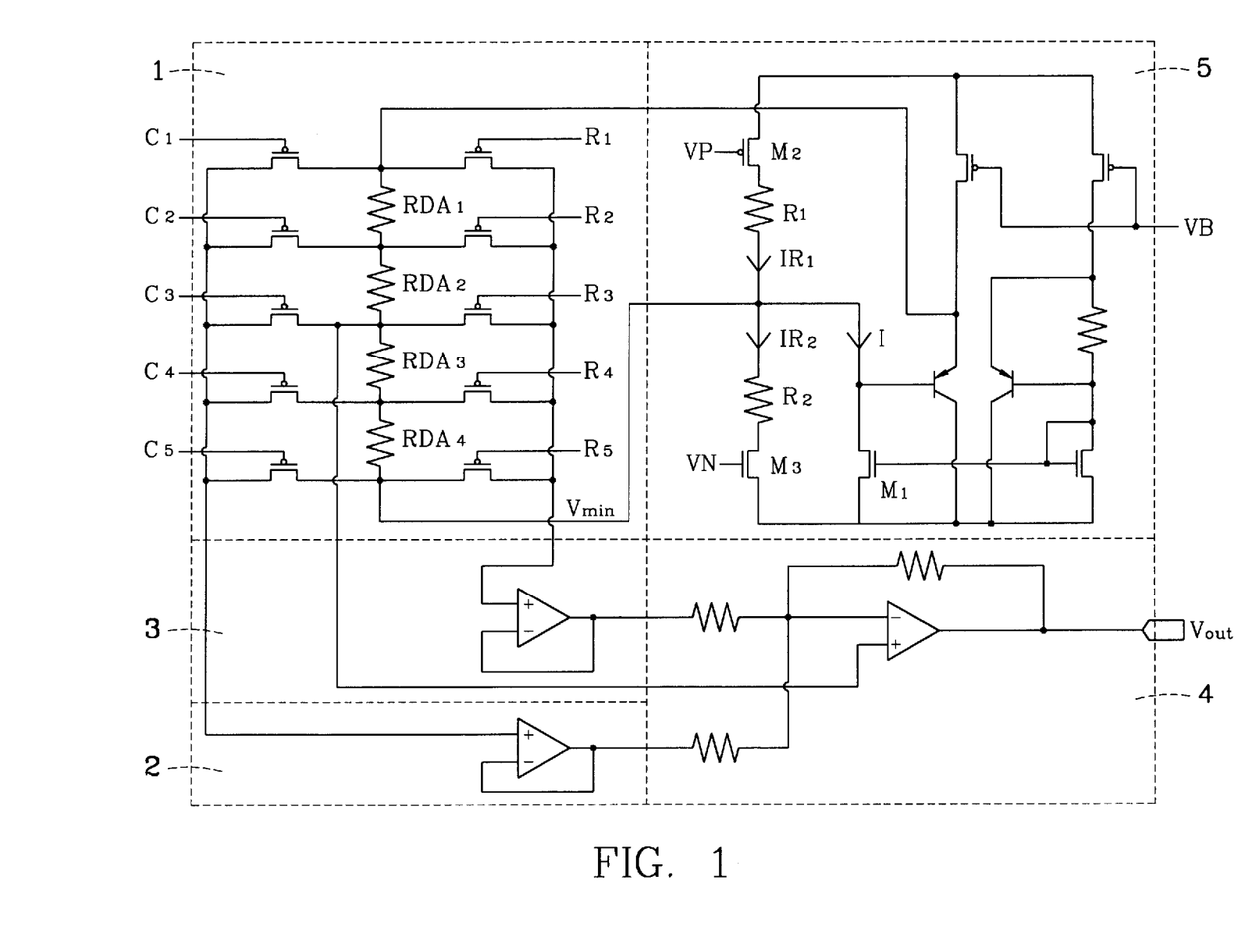
FIG. 1 is a block diagram of a conventional DTMF (dual tone multi-frequency) generator.

A conventional DTMF generator is typically an analog circuit device as shown in FIG. 1, in which block 1 is the pick-up switch assembly of DTMF voltage signal; blocks 2 and 3 form into an assembly of tracer and buffer circuits; block 4 is an analog signal adder; and block 5 is a reference voltage generator. The aforesaid analog circuit is subject to interference or signal distortions because of the manufacturing process, temperature or other environmental factors. Consequently, the output value thereof is often not conformed to the actual value. Furthermore, after an analog circuit has been used for a long time, the elements thereof are subject to aging, and the output values thereof will be affected. Therefore, the accuracy of a conventional analog circuit for generating DTMF signals is difficult to control, especially when operating at lower voltages.

Regarding the manufacturing process, the analog circuit has no flexibility in terms of circuit board area because of its characteristics, i.e., the circuit board can only be reduced to a limited extent, and cannot be reduced much further. Moreover, when the telephone line is designed, the column value signal (voltage value) and the row value signal have a ratio gain of 2 dB, but a conventional analog adder can only control gains in the range from 1–3 dB, i.e., it is unable to control the gain at exactly 2 dB, and therefore the accuracy thereof is not good.

SUMMARY OF THE INVENTION

This invention discloses an adjustable-period dual-tone multifrequency generator (DTMF), which can pick up, at a given time interval, a column and row signal wave from a user's telephone dial. The relative voltage values (the relative voltage values being pre-stored in a memory unit) and the aforesaid signal wave will, in a fixed time, pass through a digital adder and a digital-to-analog converter so as to generate a DTMF signal. The signal wave generated through the telephone dial column and row is a sine wave, in which the portions at 0°~90° and 90°~180° are symmetrical, while the portions at 180°~270° and 270°~360° are symmetrical so as to have the two lateral axis values become corresponding to the longitudinal axis values. In that case, one half of the longitudinal axis values is necessary to fill up a cycle of a sine wave so as to reduce the capacity of a memory unit in order to cut down the manufacturing cost to conform to economical principle.

The prime object of the present invention is to provide a digital circuit type of adjustable-period DTMF generator to overcome the interference or distortion typically experienced by a conventional DTMF generator as a result of the manufacturing process, temperature and other environmental factors. The digital circuit of the present invention can, under any working voltage and temperature, accurately control the gain of a column value signal to a row value signal (relative voltage values) at 2 dB, so as to maintain the circuit at a high accuracy at all times.

Another object of the present invention is to provide a digital circuit type of adjustable-period DTMF generator so as to overcome the problem of a conventional analog circuit type of DTMF generator, of which the manufacturing process and characteristics allow the circuit board area to reduce only to a limited extent without any potential for further reduction. In a digital circuit, the circuit board area thereof can be reduced considerably because of technical breakthroughs, i.e., the manufacturing technology for the digital circuit board area has a much greater flexibility.

Still another object of the present invention is to provide a digital circuit type of adjustable-period DTMF generator, in which the memory for the pre-stored data can be made with a variety of methods so as to obtain a higher flexibility. The manufacturer can design a generator in accordance with an individual requirement without being limited by the manufacturing space thereof.

A further object of the present invention is to provide an adjustable-period DTMF generator, in which the signal wave generated in every column or row on the keyboard dial is a sine wave, i.e., in a sine wave of 360°, the portions at 0°~90° and at 90°~180° are symmetrical, while the portions at 180°~270° and at 270°~360° are also symmetrical so as to have the two lateral axis values corresponding to the longitudinal value. In other words, a sine wave can be formed by means of only one half of longitudinal value. By using such characteristics and the (up/down) counters, the memory unit for storing the data value (relative voltage value) of a signal wave can generate a cycle of sine wave by using one half of the longitudinal axis value (i.e., one half of the date value, or "relative voltage value"); therefore, the capacity of the memory unit can be reduced so as to cut down the manufacturing cost thereof, and to conform to economical principles.

DETAILED DESCRIPTION

Figure 2:
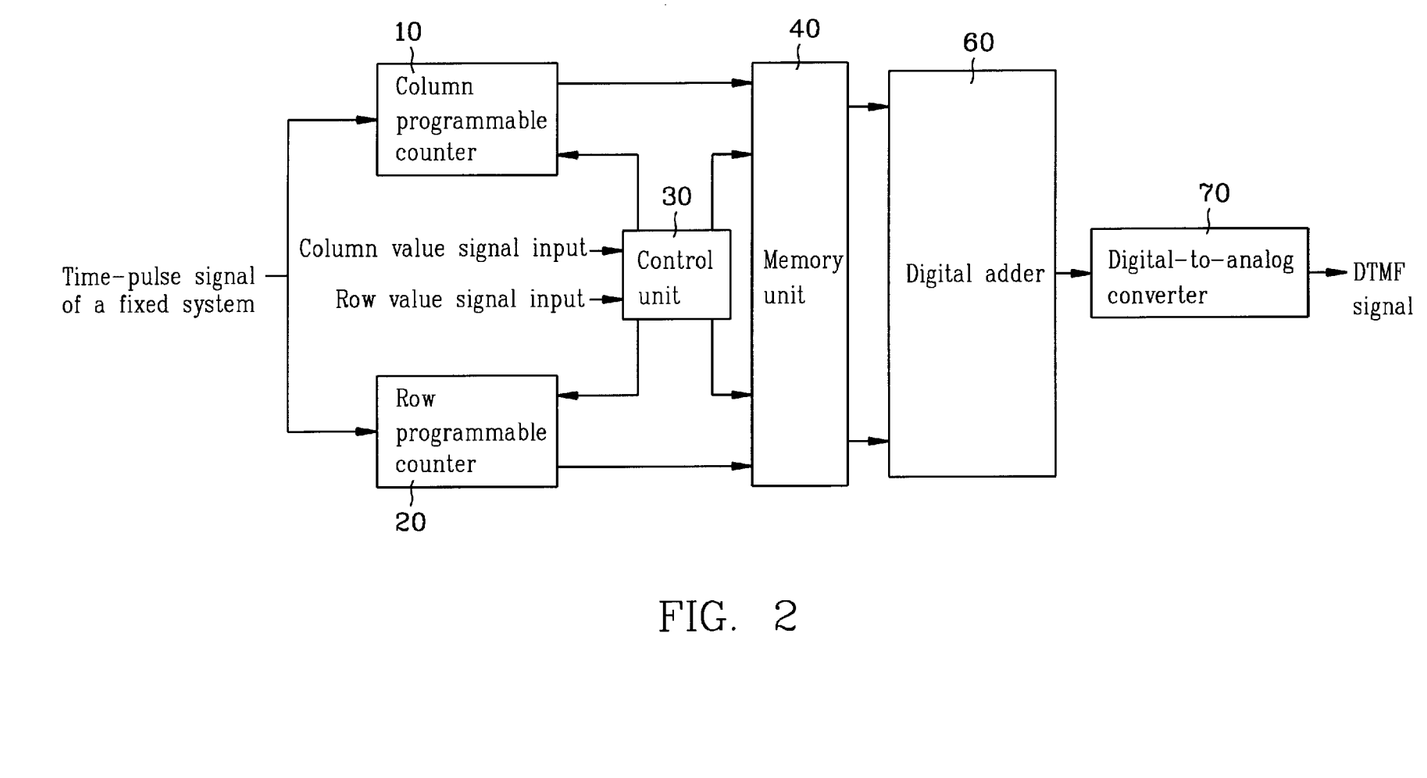
FIG. 2 is a block diagram of an embodiment-1 according to the present invention.

FIG. 2 is a block diagram of the embodiment-I according to the present invention, which comprises a control circuit unit 30, a column programmable (up/down) counter 10, a row programmable (up/down) counter 20, a memory 40, a digital adder 60, and a digital-to-analog converter 70. First, a column value signal and a row value signal from a telephone keyboard of a user are transmitted to the control unit 30; then, the control unit 30 will send a column value signal and a row value signal to the column programmable (up/down) counter 10 and the memory unit 40, and the row programmable (up/down) counter 20 and the memory unit 40 respectively. A time-pulse signal of a fixed system will be sent to the column programmable (up/down) counter 10 and the row programmable (up/down) counter 20 respectively.

Figure 4:
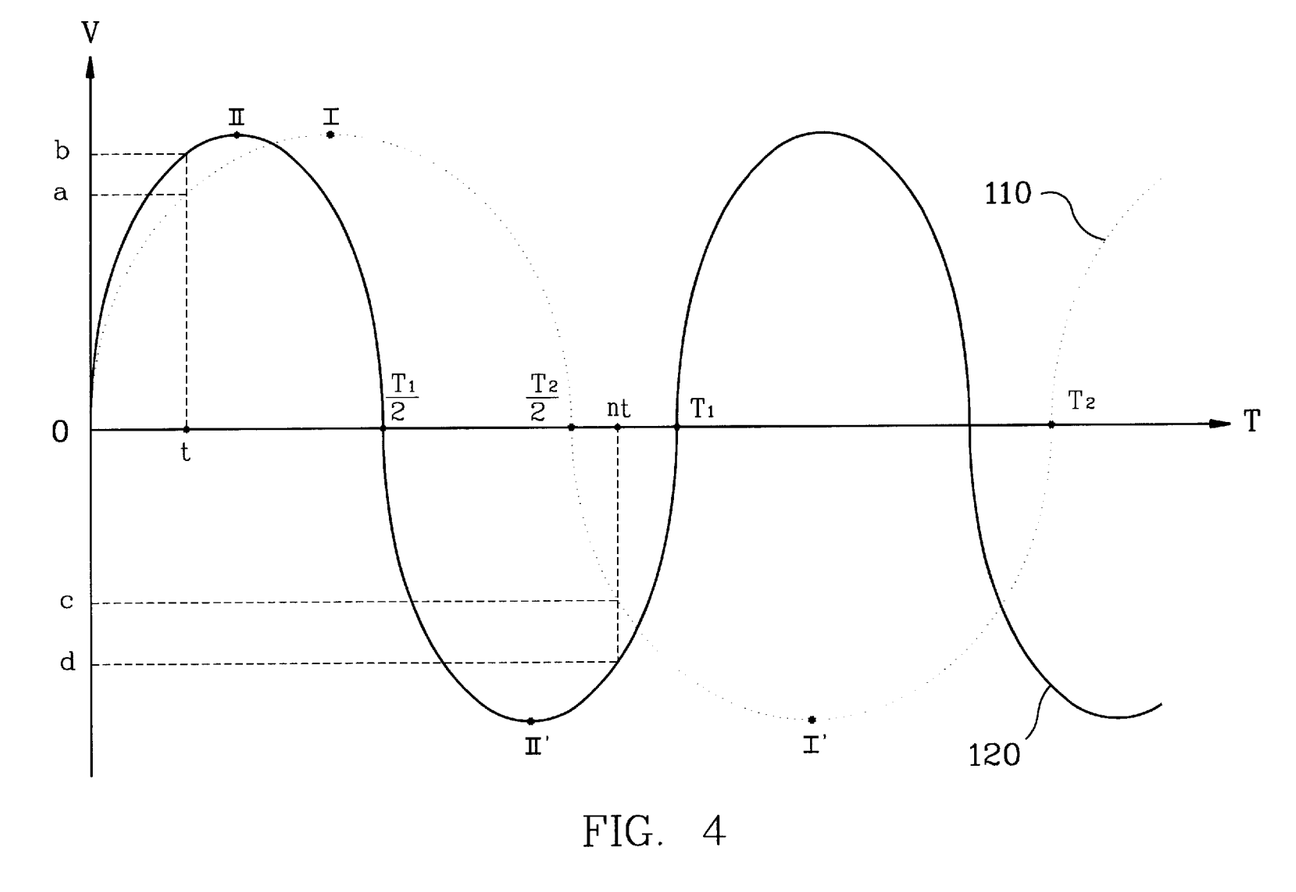
FIG. 4 illustrates a signal wave form of the embodiment according to the present invention.

After the two programmable (up/down) counters 10 and 20 have received a signal from the control unit 30, the two counters will, according to the length of counting interval ("t" value as shown in FIG. 4) designed by a user, generate a suitable counting cycle. According to the counting cycle, the counters will send out a counting signal corresponding to time and address to the memory unit 40 respectively. After receiving the column and row values from the control unit 30, and the counting signals from the column and row programmable (up/down) counters 10 and 20, and then finding out a given column and row addresses corresponding to time, the memory unit 40 will send out a stored data value (a relative voltage) corresponding to address into the digital adder 60 respectively. After processing every data value, the digital adder 60 will send out a signal of the operation result to the digital-to-analog converter 70, which will then send out a DTMF signal. The aforesaid relative voltage stands for the last amplitude out of the digital-to-analog converter. Between the amplitude and the data value stored, there is a relation of ratio.

Figure 3:
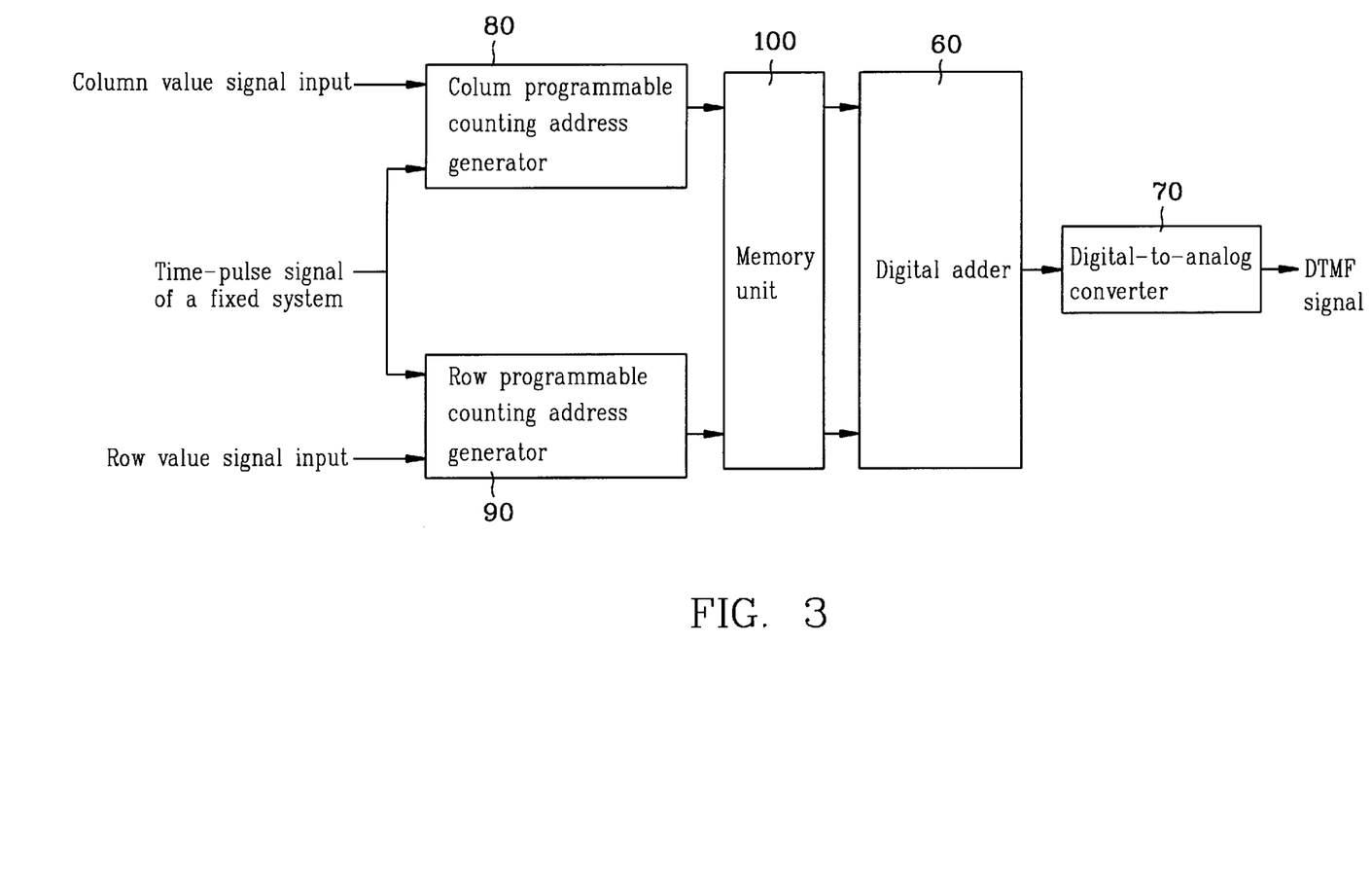
FIG. 3 is a block diagram of an embodiment-2 according to the present invention.

FIG. 3 is a block diagram of the embodiment-2 according to the present invention, which comprises a column programmable (up/down) counting address generator 80 and a row programmable (up/down) counting address generator 90 formed by means of the functions of the control unit 30, the column programmable counter 10 and the row programmable counter 20. Therefore, the user can key in a column value signal and a row value signal into the column programmable (up/down) counting address generator 80 and the row programmable (up/down) counting address generator 90, respectively. A time-pulse signal of a fixed system is sent to the two programmable (up/down) counting address generators 80 and 90 respectively first. As soon as the two programmable (up/down) counting address generators 80 and 90 receive a column value signal and a row-value signal, the two generators will generate a suitable counting signal and a counting cycle signal in accordance with the length of the counting interval designed ("t" value as shown in FIG. 4), and will send out, in a given time interval, a column and a row address signals corresponding to the time interval to a memory unit 100. After receiving the address signals and finding out the corresponding addresses, the memory unit 100 will send out a stored data values (relative voltage) corresponding to the address of the aforesaid signals to a digital adder 60 respectively. After processing the aforesaid data values, the digital adder 60 will send out an operation result signal to the digital-to-analog converter 70, and then the converter 70 will send out a DTMF signal.

Referring to FIG. 4, it illustrates a signal wave form of the embodiment according to the present invention, in which every column (or row) signal wave from the keyboard dial has the same voltage (amplitude), but has different cycle (frequency). In FIG 4., the lateral axis stands for time value, while the longitudinal axis stands for voltage value. The maximum voltage values of the sine waves I and II 110 and 120 are the same, but the cycle values T2 and T1 thereof are different. If the user wants to divide each cycle of the sine wave I 110 and the sine wave II 120 into several different sections (the sine wave I 110 being divided into T2/t sections, and the sine wave II 120 being divided into T1/t sections) in accordance with a same time interval t, the two sine waves I and II 110 and 120 will have different voltage values a and b and at time t. The two sine waves I and II 110 and 120 will also have different voltage values c and d at time nt; therefore, the memory units 40 and 100 as shown in FIG 2 and FIG 3. will first be stored at every time interval t with relative voltage values for the aforesaid column (or row) signals.

Figure 5:
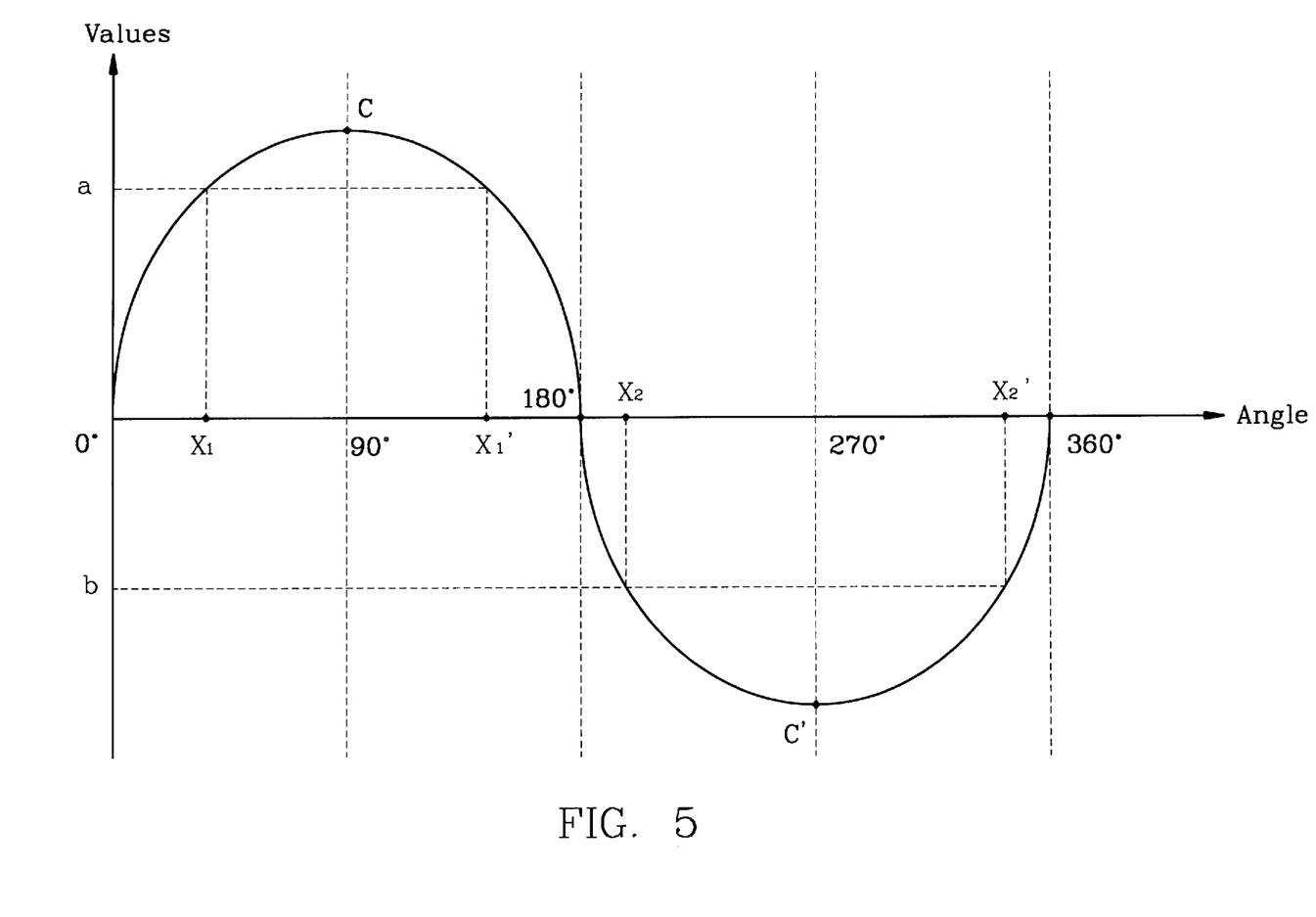
FIG. 5 illustrates a sine wave form of the present invention.
Figure 6:
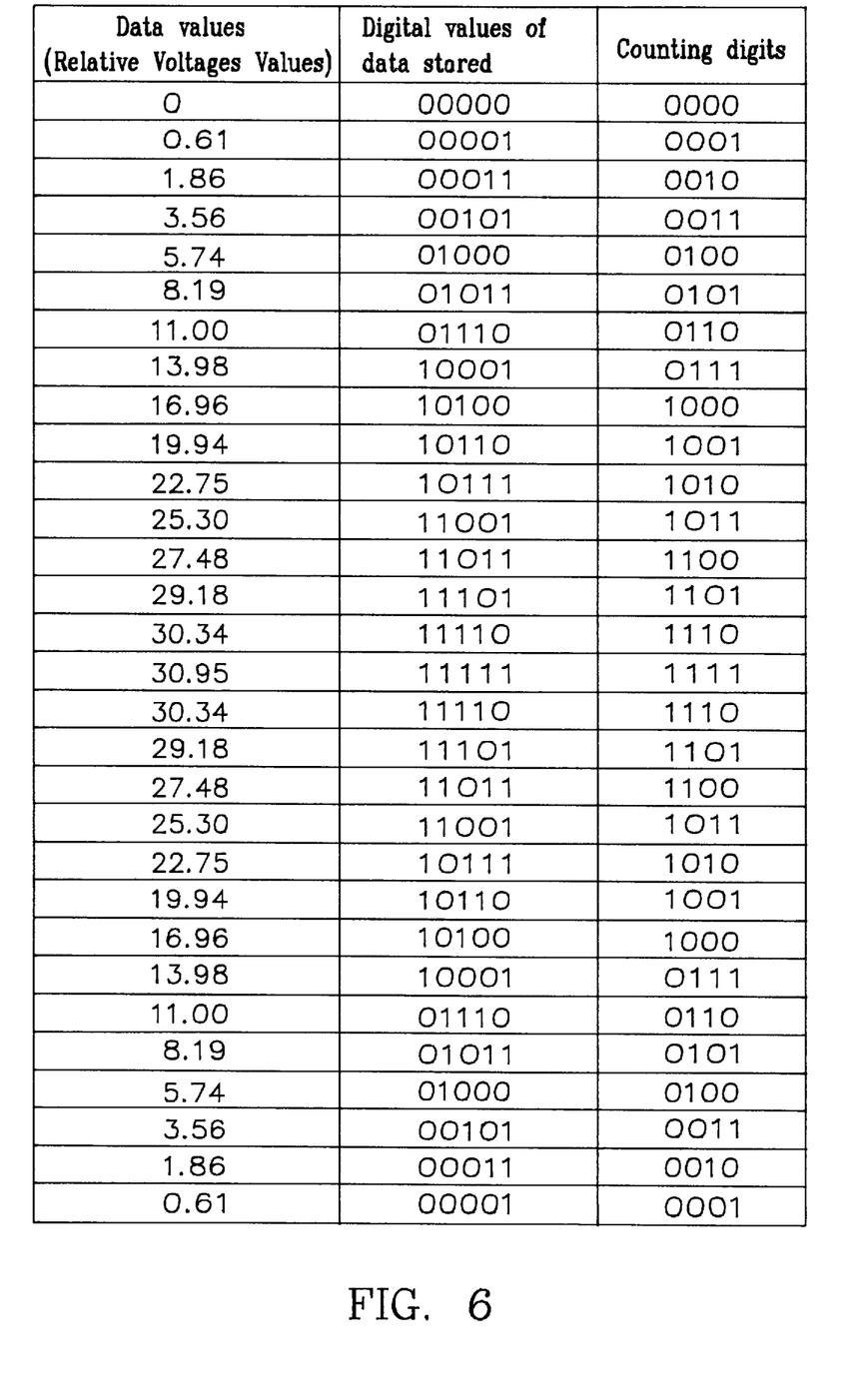
FIG. 6 illustrates the related data of the signal waves stored in an embodiment according to the present invention.

FIG. 5 illustrates a sine wave form of 360°, in which the portions at 0°~90° and 90°~180° are symmetrical in form, while 180°~270° and 270°~360° are symmetrical in form. The values of the two sections of the lateral axis are equal to that of the two corresponding sections of the longitudinal axis. As shown in that FIG., the X1 is set between 0°~90°, while X'1 is set between 90°~180°. Also X1 and X'1 are corresponding to the same longitudinal axis value a. Likewise, X2 is set between 180°~270°while X'2 is set between 270°~360°. X2 and X'2 are fallen on the symmetrical and same longitudinal axis value b. Therefore, a cycle of sine wave form can be formed simply by filling a plurality of points for a half of the longitudinal axis value (see FIG. 6 and 7). For example, the longitudinal axis values filled from 90° to 270° will include all the longitudinal axis values of the sine wave. Likewise, the memory units 40 and 100 as shown in FIGS. 2 and 3 may merely be stored with one half of the data values (relative voltage values) of one cycle of the aforesaid signal so as to reduce the memory capacity of the memory unit, and to cut down the manufacturing cost as well. However, the aforesaid theoretical idea still has some difficulties to be overcome in terms of practice. For instance, the peak points c and c' between 90°~270° of the aforesaid FIG. have no corresponding points, and therefore the counter has to make another process on the connecting point between 90° (peak point) and 270° (peak point), i.e., by using an up-down counter to perform ascending counting or descending counting. As shown in FIG. 6, the counting is made from 0000 up to 1111, and then the counting is made from 1111 down to 0000. Each cycle of the aforesaid signal wave is divided into 30 scale numerals, and each scale numeral has a corresponding data value (a relative voltage value). As shown in Table-1, the data values 0 and 30.95 are the peak points respectively. As a result of the characteristics of the sine wave, each scale numeral of the ascending counting half cycle (the data values from 0 to 30.95) and the descending counting half cycle (the data values from 30.95 to 0) of the sine wave has a corresponding and same data value as shown in FIG. 6. Therefore, the memory unit may only store the data value of the ascending counting half cycle or the descending counting half cycle. According to the system designed in FIG. 2 or 3, a suitable counting signal, a counting cycle and an address signal can be generated so as to find out a corresponding address and to send out a data corresponding to said address. The descending counting cycle of the sine wave is set between 90°~270° thereof, while the ascending counting cycle is set between 0°~90° and 270°~360°. In other words, the data stored in the memory unit are the corresponding data values set between phase angles of (90°+n·360°) to (270°+n·360°), or the corresponding data values set between the phase angles of (n·360°) to (90°+n·360°), and the phase angles of (270°+n·360°) to (n+1·360°); wherein "n" is an integer.

Figure 7:
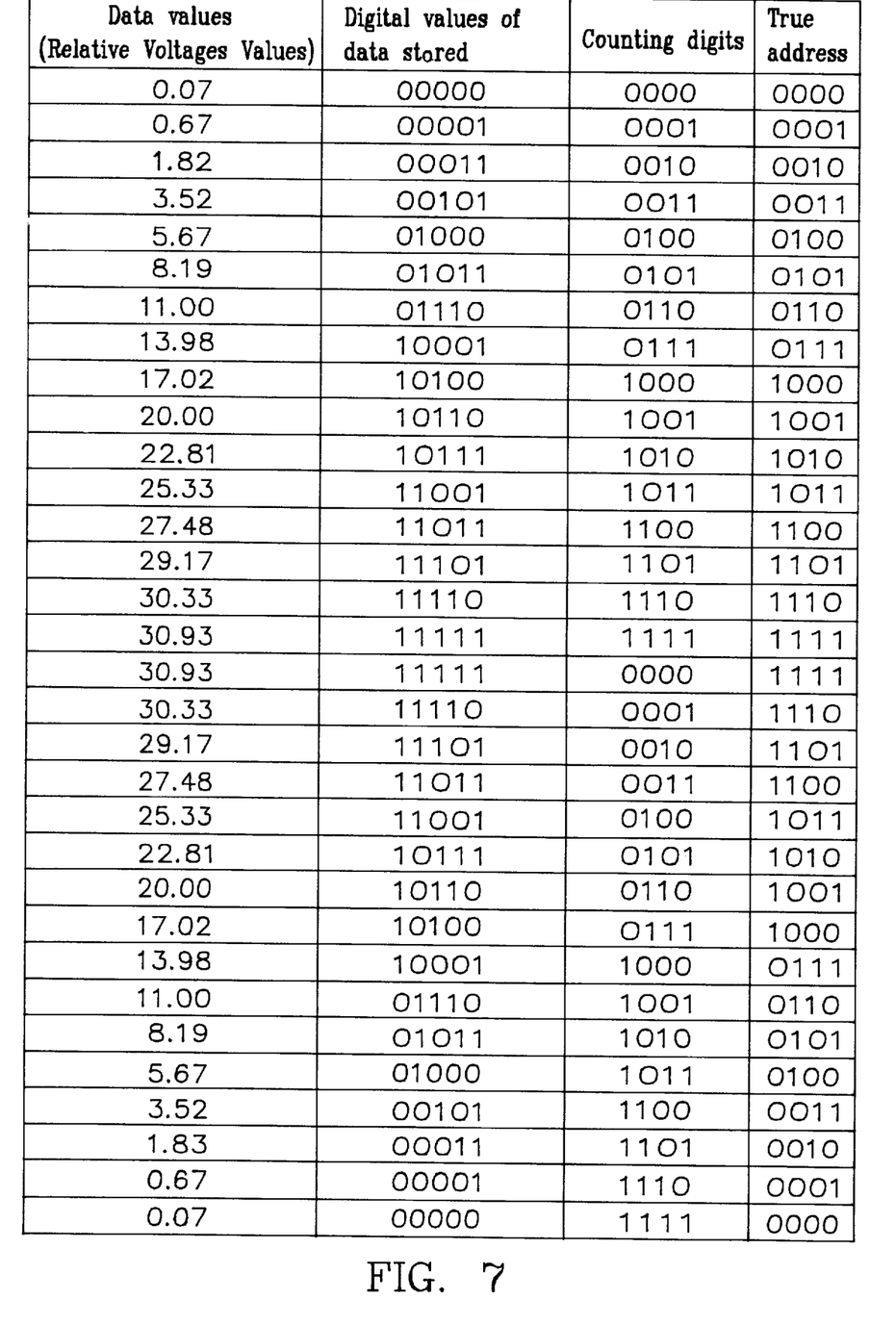
FIG. 7 illustrates the related data of the signal waves stored in the other embodiment according to the present invention.

Furthermore, the inventor has provided a solution of the asymmetrical problem of the aforesaid peak point having no corresponding point. The solution is that the memory units 40 and 100 as shown in FIGS. 2 and 3 will be stored with the aforesaid peak value signal (i.e., the peak points I, I', II, and II' of the longitudinal axis values as shown in FIG. 4). Instead, the phase of the signal wave can be set shifted at a small angle. In that case, a little bit of accuracy might be overlooked, but the tangent slope of the peak point of the sine wave is zero; therefore, the peak point and the sine wave will have little variation, and the output of the DTMF signal will not be affected. Then, there will be no connection problem between the peak points; on the other hand, the circuit design will be much easier. As shown in FIG. 7, each cycle of the signal wave is divided into 32 scale numerals, of which each has a corresponding data value; for example, the data values are ranging from 0.07 to 30.93, and from 30.93 to 0.07. Each scale numeral has a corresponding data value; therefore, the memory unit can be stored with a data value merely corresponding one half cycle of the sine wave, i.e., the data values corresponding to the phase angles of (90°+n·360°) to (270°+n·D360°), and the phase angles of (n·360°) to (90°+n·360°). The difference between FIG. 7 and FIG. 6 is that la one-way ascending counting from 0000 to 1111, and then counting again from 0000 upwards. In the aforesaid counters, the flip-plops thereof can send out a given numeral and the complement numeral thereof simultaneously. Although a signal wave according to the embodiment has been divided into 32 scale numerals, a counter of 4 bits can be used for the counting operation by sending out a complement numeral during a suitable time period. As shown in FIG. 7, during counting from 0000 to 1111 at the second time, the output is the complement numerals. When counting from 0000 to 1111, the output is the complement numerals, but the actual counting addresses are from 1111 to 0000 to provide an up/down counting function.

In brief, the present invention provides a method of obtaining a column and row values sent through a dial by a user by means of a fixed time interval. The aforesaid signal waves have corresponding relative voltage values. By means of the digital adder and the digital-to-analog converter, a digital circuit is designed and formed so as to overcome the problems of interference or distortion of a conventional analog circuit which are caused by the manufacturing process thereof, temperature and environmental factors; then, the accuracy of an output signal will be improved considerably. Only one half of the data values (relative voltage values) of a cycle of the signal wave stored in the memory unit will be sufficient to generate a signal wave so as to reduce the manufacturing cost, and to conform to economical principle.

What is claimed is:

1. An adjustable-period dual-tone multifrequency generator comprising:
    a control unit for receiving a column value signal and a row value signal, and sending out a control signal;
    a column programmable counter for receiving a time-pulse signal of a fixed system, and receiving a control signal out of said control unit, and generating a counting signal and a counting cycle according to length of a counting time interval designed by a user, according to said counting signal, an address signal corresponding to said time being sent out at a given time interval, a cyclic mode of said address signal being an up/down type of cycle;
    a row programmable counter for receiving a time-pulse signal of said fixed system, and receiving a control signal out of said control unit, and generating a counting signal and a counting cycle according to length of a counting time interval designed by a user, according to said counting signal of said row programmable counter, an address signal corresponding to said time of said row programmable counter being sent out at a given time interval, a cyclic mode of said address signal of said row programmable counter being an up/down type of cycle;
    a memory unit for receiving a control signal out of said control unit and signals out of said column and row programmable counters, and also sending out data values corresponding to signals out of said column and row programmable counters;
    a digital adder for receiving data values out of said memory unit respectively, and making operation process for every said data, and then sending out an operation result signal;
    a digital-to-analog converter for receiving a signal out of said digital adder so as to convert the signal out of said digital adder into an analog signal, and to send out a DTMF signal;
    wherein said data stored in said memory unit are data values in phase angles of only 90° to 270° of a sine wave.

2. An adjustable-period dual-tone multifrequency generator comprising:
    a column programmable counting address generator for receiving a time-pulse signal of a fixed system, and then sending out an address signal corresponding to said time at a given time interval in accordance with a counting signal and a counting cycle signal designed by a user in advance;
    a row programmable counting address generator for receiving a time-pulse signal of said fixed system, and then sending out an address signal corresponding to said time of row programmable counting address generator at a given time interval in accordance with a counting signal and a counting cycle signal designed by a user in advance;
    a memory unit for receiving output signals out of said column programmable counting address generator and said row programmable counting address generator, and sending out data values corresponding to the output signals out of said column programmable counting address generator and said row programmable counting address generator, respectively;
    a digital adder for receiving data out of said memory unit, and making operation process for every said data, and then sending out an operation result signal; a digital-to-analog converter for receiving a signal out of said digital adder, and converting the signal out of said digital adder into an analog signal and then sending out a DTMF signal;
    wherein said data stored in said memory unit are data values in phase angles of 90° to 270° of a sine wave.

3. An adjustable-period dual-tone multifrequency generator comprising:
    a control unit for receiving a column value signal and a row value signal, and sending out a control signal;
    a column programmable counter for receiving a time-pulse signal of a fixed system, and receiving a control signal out of said control unit, and generating a counting signal and a counting cycle according to length of a counting time interval designed by a user, according to said counting signal, an address signal corresponding to said time being sent out at a given time interval, a cyclic mode of said address signal being an up/down type of cycle;
    a row programmable counter for receiving a time-pulse signal of said fixed system, and receiving a control signal out of said control unit, and generating a counting signal and a counting cycle according to length of a counting time interval designed by a user, according to said counting signal of said row programmable counter, an address signal corresponding to said time of said row programmable counter being sent out at a given time interval, a cyclic mode of said address signal of said row programmable counter being an up/down type of cycle;

a memory unit for receiving a control signal out of said control unit and signals out of said column and row programmable counters, and also sending out data values corresponding to signals out of said column and row programmable counters;

a digital adder for receiving data values out of said memory unit respectively, and making operation process for every said data, and then sending out an operation result signal;

a digital-to-analog converter for receiving a signal out of said digital adder so as to convert the signal out of said digital adder into an analog signal, and to send out a DTMF signal;

wherein a data stored in said memory unit is a data value set between a phase angle of only 0° to 90° and a phase angle of 270° to 360° of a sine wave.

4. An adjustable-period dual-tone multifrequency generator as claimed in claim 1, wherein said data stored in said memory unit includes a peak point set at a phase angle of 90° or 270°.

5. An adjustable-period dual-tone multifrequency generator as claimed in claim 3, wherein said peak point value is a value at a phase angle of (90°±n·180°); and "n" therein being an integer.

6. An adjustable-period dual-tone multifrequency generator as claimed in claim 1, wherein said column programmable counter is a column programmable up/down counting address generator.

7. An adjustable-period dual-tone multifrequency generator as claimed in claim 1, wherein said row programmable counter is a row programmable up/down counting address generator.

8. An adjustable-period dual-tone multifrequency generator as claimed in claim 2, wherein said column programmable counting address generator is a column programmable up/down counting address generator.

9. An adjustable-period dual-tone multifrequency generator as claimed in claim 2, wherein said row programmable counting address generator is a row programmable up/down counting address generator.

10. An adjustable-period dual-tone multifrequency generator as claimed in claim 2, wherein said data stored in said memory unit includes a peak point set at a phase angle of 90° or 270°.

* * * * *